United States Patent [19]

Comstock

[11] Patent Number: 4,541,087

[45] Date of Patent: Sep. 10, 1985

[54] DIGITAL TELECONFERENCING CONTROL DEVICE, SYSTEM AND METHOD

[75] Inventor: Bluford M. Comstock, Boulder, Colo.

[73] Assignee: ConferTech International, Inc., Denver, Colo.

[21] Appl. No.: 508,256

[22] Filed: Jun. 27, 1983

[51] Int. Cl.³ .............................................. H04Q 11/04
[52] U.S. Cl. ....................................................... 370/62
[58] Field of Search ...................... 370/62; 179/18 BC

[56] References Cited

U.S. PATENT DOCUMENTS

| | | | |
|---|---|---|---|
| 3,924,082 | 12/1975 | Oliver et al. | 179/18 |
| 3,970,797 | 7/1976 | Johnson et al. | 179/15 |
| 3,984,643 | 10/1976 | Inrig et al. | 179/18 |
| 4,054,757 | 10/1977 | LeJay | 179/18 |
| 4,109,111 | 8/1978 | Cook | 179/18 |
| 4,119,807 | 10/1978 | Nahay | 179/18 |
| 4,190,742 | 2/1980 | Southard | 179/18 |
| 4,190,744 | 2/1980 | Frank | 179/18 |
| 4,203,005 | 5/1980 | Fukuda et al. | 179/18 BC |
| 4,215,247 | 7/1980 | Lambert | 179/18 |
| 4,225,956 | 9/1980 | Bett et al. | 370/62 |
| 4,229,814 | 10/1980 | Betts | 370/62 |
| 4,267,593 | 5/1981 | Regan et al. | 370/62 |
| 4,271,502 | 6/1981 | Goutmann et al. | 370/62 |
| 4,276,639 | 6/1981 | Fukuda et al. | 370/62 |
| 4,280,216 | 7/1981 | Zeitrag | 370/62 |
| 4,301,531 | 11/1981 | Lubin | 370/62 |
| 4,360,910 | 11/1982 | Segal et al. | 370/62 |
| 4,455,647 | 6/1984 | Gueldner | 370/62 |

Primary Examiner—Douglas W. Olms
Attorney, Agent, or Firm—O'Rourke & Harris

[57] ABSTRACT

A digital teleconferencing control device, system and method are disclosed for use in telecommunications. A digital conference control circuit having pulse code modulation and time division multiplexing is used in connecting a plurality of telephone subscribers together for conference purposes. When so connected, a plurality of then selected speakers can be heard by all other subscribers connected into the conference with the number of subscribers connectable into the conference being unlimited. Logic gates at the digital level in the control circuitry prevents return of signals generated by a speaking subscriber back to that subscriber.

29 Claims, 6 Drawing Figures

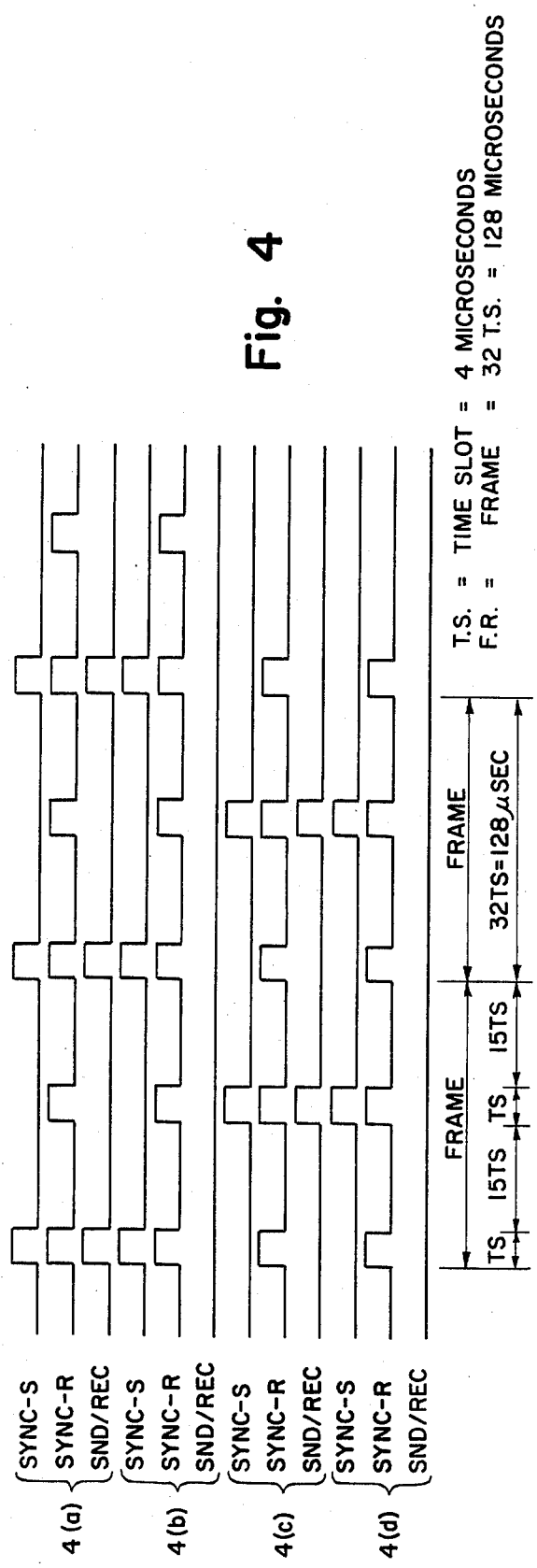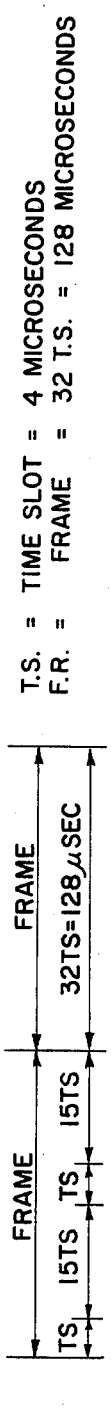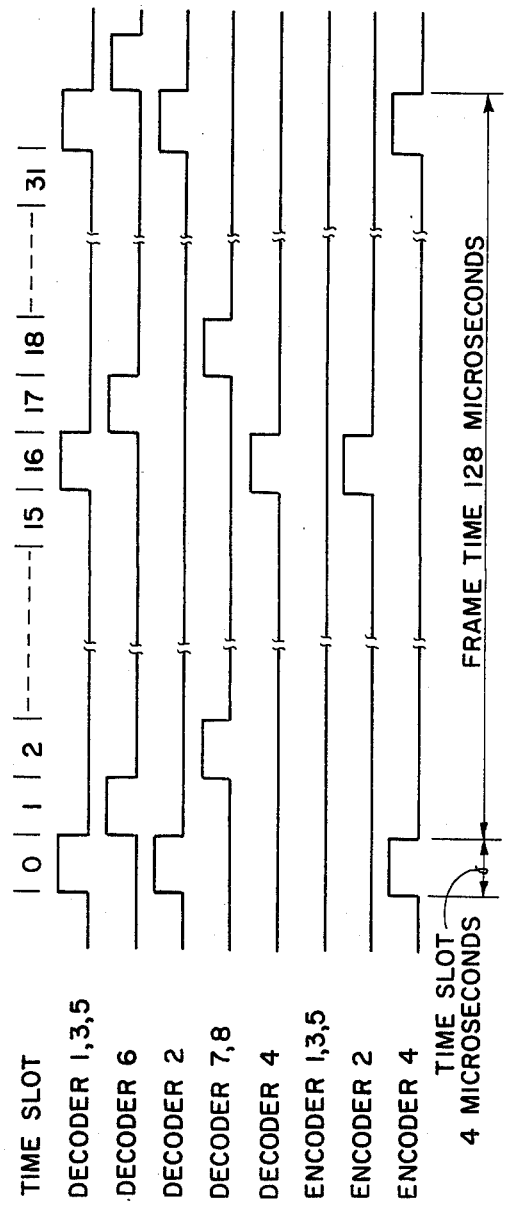

DIGITAL TELECONFERENCING CONTROL DEVICE, SYSTEM AND METHOD

FIELD OF THE INVENTION

This invention relates to a teleconferencing system and method and, more particularly, relates to a digital teleconferencing control system and method.

BACKGROUND OF THE INVENTION

The use of telephone equipment to connect parties for audio conferencing purposes is well known. Such equipment has not proved, however, to be successful in providing a completely satisfactory audio conference, particularly where several parties are to be connected into the conference. Among problems heretofore encountered have been inability of the system to prevent sending the signal generated by a speaking subscriber back to that subscriber, excessive noise in the established communication link, deterioration of signal quality as subscribers are added to the conference, and/or inability of the system to enable a plurality of speakers to simultaneously talk and be heard by all other subscribers connected into the conference.

SUMMARY OF THE INVENTION

This invention provides an improved teleconferencing control system and method that permits a large number of subscribers to be connected together for conferencing purposes without adversely affecting signal quality. In addition, line noise is controlled at a useable level, the signal is prevented from being sent back to the sending subscriber, and a plurality of speakers can simultaneously talk and be heard by all other subscribers then connected into the conference.

It is therefore an object for this invention to provide an improved teleconferencing control device, system and method.

It is another object of this invention to provide an improved teleconferencing control device, system and method capable of permitting virtually an unlimited number of subscribers to be connected together without adversely affecting signal quality.

It is another object of this invention to provide an improved teleconferencing control device, system and method capable of enabling simultaneous speech by a plurality of subscribers connected into a conference with all subscribers connected into the conference being able to hear the plurality of subscribers then selected for speaking.

It is still another object of this invention to provide an improved teleconferencing control device and system having improved noise control.

It is yet another object of this invention to provide an improved teleconferencing control device, system and method that inhibits sending of a signal generated by a speaking subscriber back to that subscriber.

It is still another object of this invention to provide an improved teleconferencing control device, system and method using pulse code modulation.

It is still another object of this invention to provide an improved teleconferencing control device, system and method using time division multiplexing.

With these and other objects in view, which will become apparent to one skilled in the art as the description proceeds, this invention resides in the novel construction, combination, arrangement of parts and method substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 4 is a series of typical pulse trains to illustrate operation of the circuitry as shown in FIGS. 1 and 3;

FIG. 5 is a series of timing diagrams illustrating operation of the circuitry as shown in FIGS. 1 and 3.

DESCRIPTION OF THE INVENTION

Figure 1:
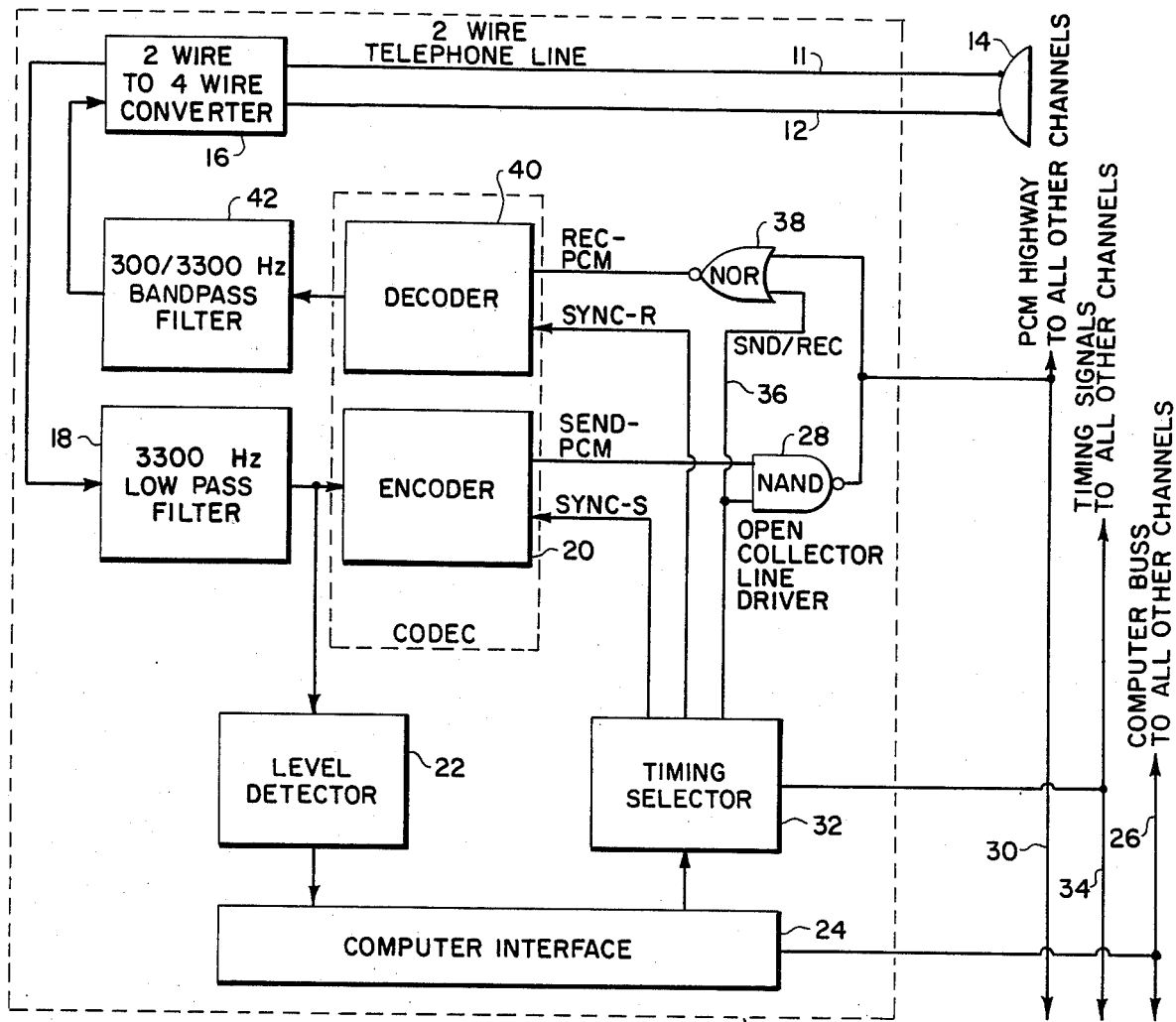
FIG. 1 is a block diagram of the teleconferencing control device of this invention.

Referring now to the drawings, teleconferencing control device 9 is shown in block form in FIG. 1. Teleconferencing control device 9 is a per-line, or channel, device. As shown in FIG. 1, and as is conventional, two-wire telephone line 11–12 connects telephone 14 to two-to-four wire converter 16.

Incoming signals on the telephone line are received at converter 16 and passed through low pass filter 18 (3300 Hz) to codec encoder 20 and level detector 22.

Level detector 22 provides an output to computer interface circuitry 24 to set a bit in the computer interface indicative of the presence of a valid signal. Computer interface circuitry 24 is connected with computer buss 26 as a part of the overall control system as shown in more detail in FIG. 3.

Codec encoder 20 samples the incoming signal, compresses the same and converts the compressed signal into a digital signal, and, more particularly, converts the compressed signal into an eight bit pulse code modulated (PCM) word.

Timing selector 32 is connected with timing signal buss 34 and with computer interface unit 24. When timing selector 32 provides an output pulse (SYNC-S) to codec encoder 20, this causes the codec encoder to output, in serial form, the PCM word on the SND-PCM line to NAND gate 28.

At NAND gate 28, a selection is made to either send a PCM word out to PCM highway 30 or to receive a PCM word from PCM highway 30. If a pulse is then present on SND/REC line 36, this pulse will cause NAND gate 28 to be in an "on" state and will cause NOR gate 38, connected with codec decoder 40, to be in an "off" state. This allows the PCM word from codec encoder 20 to pass through NAND gate 28 to the PCM highway but will block the PCM word from passing back through NOR gate 38 to decoder 40 and hence back to the sending subscriber. By isolating the output, the gain of the encoder is made independent of output and thus gain is made selective for each channel of the overall system.

The absence of a pulse on SND/REC line 36 will cause NAND gate 28 to be in an "off" state and NOR gate 38 to be in an "on" state to thus block passage of the PCM word from the encoder to the PCM highway and allow the PCM word on the PCM highway to pass through NOR gate 38 to decoder 40.

When a SYNC-R pulse is applied from timing selector 32 to codec decoder 40, the PCM word from the PCM highway is shifted into the decoder. Decoder 40 is operated at a sampling rate twice that of the encoder so that the decoder can decode two encoded signals.

Figure 2:
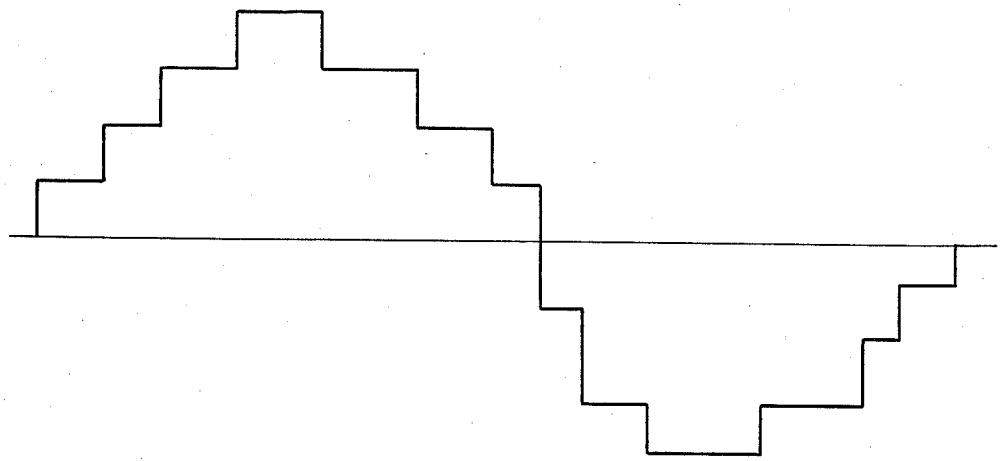
FIG. 2 is a typical illustration of the output of the decoder included in the device shown in FIG. 1.

At decoder 40, the two incoming digital signals are alternately expanded and decoded from digital to analog with the output from the decoder being in the form of a quantized voltage level between about +2 volts and −2 volts, as shown typically in FIG. 2 for a quantized sine wave.

The two analog output signals from decoder 40 are averaged together in bandpass filter 42 (300 to 3300 Hz) and then passed through converter 16 connected with telephone 14 through telephone line 11-12.

Figure 3:
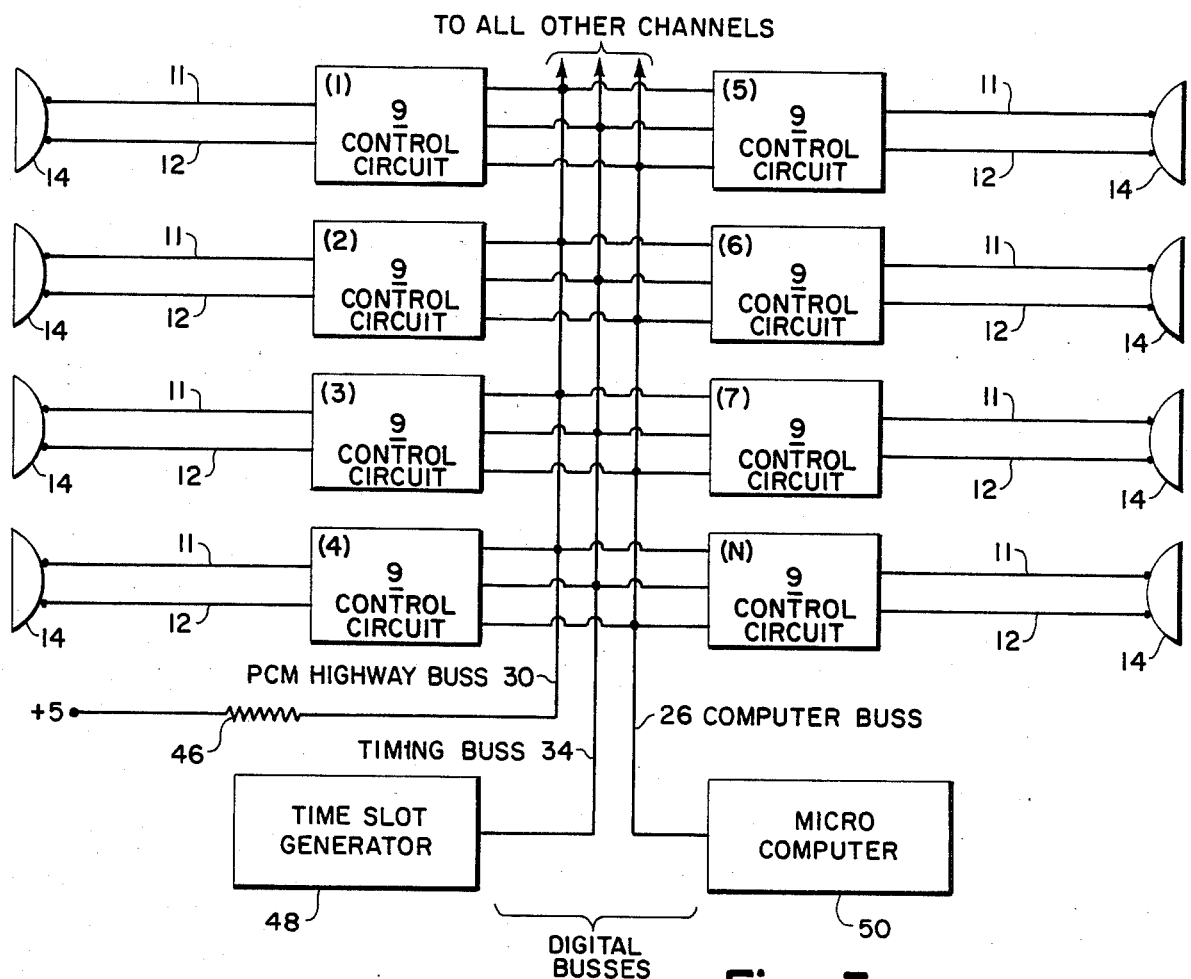
FIG. 3 is a block diagram of the teleconferencing system of this invention for interconnecting a plurality of subscribers for teleconferencing purposes.

As shown in FIG. 3, one control device, or circuit 9 is required for each subscriber line connected into the bridge system. While eight such subscriber lines are shown in FIG. 3, the number of lines is virtually unlimited.

As also shown in FIG. 3, PCM highway bus 30 is connected with PCM input/output of all control circuits and is connected with a +5 volt power supply through pull-up resistor 46 (270 ohms), while timing buss 34 is connected with time slot generator 48, and computer buss 26 is connected with microcomputer 50.

Time slot generator 48 provides a series of pulses which are coupled to the time selector 32 in each channel circuit 9. Timing selector 32 selects from the timing pulses one SYNC-S and two SYNC-R pulses to be supplied to the codec encoder and decoder.

Selection of the sequence of SYNC-R and SYNC-S pulses is made by computer 50 which is connected to the timing selector through computer buss 26 and computer interfaces 24. This selection determines when the SND/REC pulse will be issued by each time selector.

As shown in FIG. 4, time slot generator 48 produces a cycle, or FRAME, consisting of 32 time slots each of which has a duration of four microseconds. Thus, each FRAME consists of 128 microseconds during which one SYNC-S pulse and two SYNC-R pulses are produced for each conference group. As shown in FIG. 4, a SYNC-S pulse can occur in the same time period as does either the first or second SYNC-R pulse (SYNC-R pulses are separated by fifteen time slots, i.e., sixty microseconds), while the SND/REC pulses can occur at either or neither of the time periods when the SYNC-R pulse occurs.

If, as shown in FIG. 4(a), the SYNC-S and SND/REC pulses occur during the first time slot of the FRAME, the PCM word is gated from the encoder to the PCM highway and the PCM word on the PCM highway is blocked from reaching the decoder. Only one control circuit 9 in each conference will receive this pulse sequence at any given time.

If, as shown in FIG. 4(b), the SYNC-S pulse occurs during the first time slot but the SND/REC pulse does not occur, then the encoder is prevented from gating the PCM word to the PCM highway, and the decoder can receive a PCM word that is then on the PCM highway. As also shown in FIG. 4(b), if the SND/REC pulse does not appear at the time slot of the second SYNC-R pulse, the decoder can receive a second PCM word on the PCM highway during this time period. All but two of the control circuits 9 in a conference will receive this pulse sequence at any given time.

As shown in FIG. 4(c), if the SYNC-S and SND/REC pulses occur during the time slot when the second SYNC-R pulse occurs, the PCM word from the encoder is placed on the PCM highway during the second time slot occurrence of the SYNC-R pulse and passage of the PCM word back to the decoder is precluded during this time slot. Only one control circuit 9 in each sequence receives this pulse sequence at any given time.

As shown in FIG. 4(d), if the SYNC-S pulse occurs during the time slot of the second SYNC-R pulse, but the SND/REC pulse does not then occur, the PCM word from the encoder is prevented, or inhibited, from passing to the PCM highway and the decoder can receive both of the PCM words from the PCM highway. All but two control circuits 9 receive this pulse sequence at any given time.

It should be noted that up to fifteen other conferences can occur using the fifteen time slots between the occurrence of the two SYNC-R pulses as shown in FIG. 4. Thus, with each conference using two time slots in each thirty-two slot FRAME, a maximum of sixteen conferences can be conducted simultaneously. The timing diagrams of FIG. 5 typically illustrate the foregoing with channels 1 through 5 being assigned slots 0 and 8 and channels 6 through 8 being assigned succeeding slots. As shown, where a high occurs on the encoder SYNC-S line during a given time period, the encoder places a PCM word on the PCM highway buss during this time period (during which time the decoder is precluded from receiving a PCM word from the PCM highway). In like manner, when a high occurs on the SYNC-R line, the decoder will receive the PCM word from the PCM highway buss and decode the word.

Thus, for all given time slots, all encoders can receive one SYNC-S pulse during each FRAME and two SYNC-R pulses during each FRAME. This timing allows any decoder assigned to a given time slot (which defines the conference link for that particular conference) to decode PCM words received from any chosen two encoders in the same time slot and provide outputs indicative thereof to the telephone line to which it is connected. As a result, any two people in a conference can speak at any given time and be heard by all other people in the conference.

Figure 6:
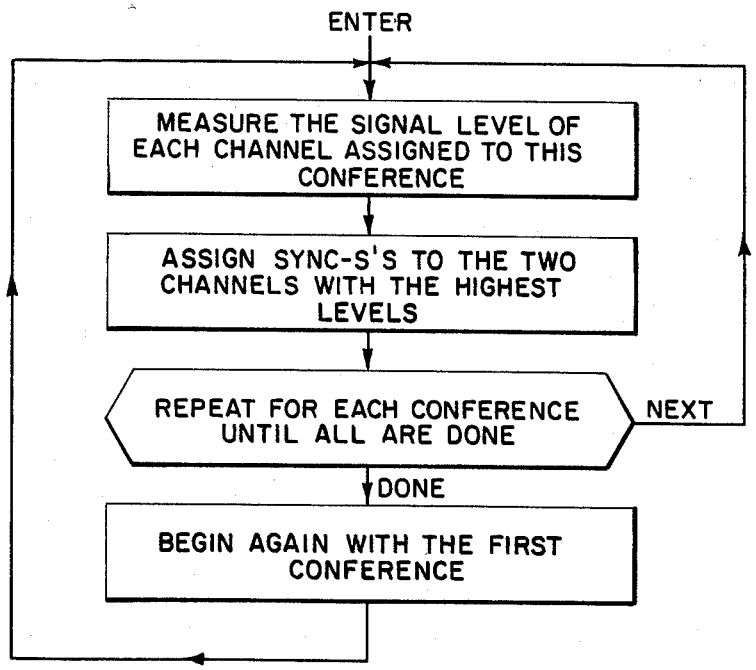
FIG. 6 is a flow chart of the operation of the computer as shown in FIG. 3.

Within each conference, computer 50 determines which two per-line, or channel, circuits 9 will place PCM words on the PCM highway. To accomplish this, an algorithm is performed every two milliseconds which chooses and outputs the SND/REC control for each per-line circuit 9 in the system. A flow chart of the algorithm is shown in FIG. 6.

Computer 50 determines available time slots from a time slot memory, and makes time slot assignments by sending an eight-bit control word to all channels of the given conference on computer buss 26. From this control word, each channel generates the SYNC-S and SYNC-R signals.

In a working embodiment, conventional elements have been utilized for the codec (encoder and decoder), filters, level detector, timing generators and computer. If desired, more than two speakers could be heard by operating the decoder at greater speeds. For example, if the decoder is operated at a speed of four times per FRAME with four encoders per FRAME to encode, then four subscribers could be heard simultaneously by all subscribers then connected into the conference.

As can be appreciated from the foregoing, teleconferencing is improved by use of the control device, system and method of this invention.

What is claimed is:

1. A digital teleconferencing control device, comprising:

first connecting means adapted to be connected with telephone means capable of providing signals in analog form;

second connecting means adapted to be connected with highway means capable of carrying signals in digital form; and signal processing means connected with said first and second connecting means for receiving analog signals from said first connecting means during a predetermined time period within predetermined time frames, and responsive thereto providing output signals in digital form to said second connecting means unless digital signals are then present on said highway means during said predetermined time period, and for receiving, during preselected time periods within said predetermined time frames with one of said preselected time periods occurring timewise simultaneously with said predetermined time period, a plurality of digital signals from said second connecting means, when such digital signals are present on said highway means during said preselected time periods, for combining said signals at said signal processing means except that digital signals provided to said highway means originating from said first connecting means are precluded from being received and combined with other digital signals at said signals processing means, and responsive thereto providing output signals in analog form indicative of said received digital signals to said first connecting means whereby said control device can be utilized to both place an outgoing digital signal on said highway means and receive incoming digital signals from said highway means during said predetermined time frames to thereby provide apparent simultaneous speaking and listening capabilities at said telephone means.

2. The device of claim 1 wherein said signal processing means includes encoding means for providing said digital signals, and decoding means for decoding a received plurality of digital signals, said decoding means operating at a speed greater than that of said encoding means to enable decoding of said plurality of digital signals.

3. The device of claim 2 wherein said encoding means includes pulse code modulation encoding means, and said decoding means includes pulse code modulation decoding means.

4. The device of claim 1 wherein said signal processing means includes logic gate means connected with said connecting means and precluding passage of said digital signals originating from said first connecting means back to said first connecting means.

5. The device of claim 1 wherein said device includes timing selection means connected with said signal processing means for determining said predetermined and preselected time periods during which signals may be processed by said signal processing means.

6. A digital teleconferencing control device, comprising:

a plurality of first connecting means each of which is adapted to be connected with a different one of a plurality of telephone means;

a plurality of second connecting means adapted to be connected with highway means capable of carrying signals in digital form;

a plurality of signal processing means each of which is connected with a different one of each of said first and second connecting means; and determining means connected with said plurality of signal processing means for causing then selected ones of said signal processing means to receive, during a predetermined time period within predetermined time frames, analog signals from said connecting means associated therewith and responsive thereto providing output signals in digital form to said highway means during separate predetermined time periods within predetermined time frames, unless digital signals are then present on said highway means during that predetermined time period during which said digital signals are to be provided to said highway means, for preventing passage of digital signals from said highway means to said then selected signal processing means during said predetermined time period that digital signals are then being provided to said highway means from said then selected signal processing means, and for causing said signal processing means to receive, during said predetermined time periods, a plurality of digital signals from said highway means, when said digital signals are present on said highway means during said predetermined time periods, for combining said signals at said signal processing means, and responsive thereto providing output signals in analog form indicative of said received digital signals to said first connecting means whereby said control device can be utilized to both place an outgoing digital signal on said highway means and receive incoming digital signals from said highway means during said predetermined time frames to thereby provide apparent simultaneous speaking and listening capabilities at said telephone means.

7. The device of claim 6 wherein each of said signal processing means includes logic gate means including a NAND gate and a NOR gate.

8. The device of claim 7 wherein each of said signal processing means includes encoding means for providing said digital signals to said highway means through said logic gate means and decoding means for receiving digital signals from said highway means through said logic gate means, and wherein said NAND gate is connected with said encoding means and said NOR gate is connected with said decoding means.

9. The device of claim 7 wherein said determining means causes said NAND gate to prevent passage of a digital signal while said NOR gate passes a digital signal, and wherein said NOR gate prevents passage of a digital signal while said NAND gate passes a digital signal.

10. A digital teleconferencing control device, comprising:

first connecting means adapted to be connected with telephone means;

second connecting means adapted to be connected with highway means capable of carrying pulse code modulated digital signals, said second connecting means including logic gate means;

low pass filter means connected with said first connecting means to receive analog signals therefrom;

bandpass filter means connected with said first connecting means to supply analog signals thereto;

encoding means connected with said low pass filter means to receive said analog signals therefrom and responsive thereto providing pulse code modulated digital output signals to said second connecting means through said logic gate means;

decoding means connected with said second connecting means through said logic gate means, said decoding means operating at a speed that is an integer greater than that of said encoding means and, responsive to receipt of pulse code modulated digital output signals from said logic gate means, providing analog signals to said bandpass filter means; and selection means connected with said encoding means, said decoding means and said gate means whereby, during a first predetermined time period within a predetermined time frame, said encoding means provides pulse code modulated digital output signals through said logic gate means to said second connecting means, unless a digital signal is then present on said highway means during said predetermined time period, and prevents receipt of said pulse code modulated digital output signals by said decoding means through said logic gate means if digital signals are then being provided to said highway means from said encoding means, and whereby, during preselected time periods one of which occurs timewise simultaneously with said predetermined time period, said decoding means receives a predetermined plurality of pulse code modulated digital output signals from said second connecting means through said gate means, other than digital signals provided to said highway means originating from said first connecting means, and provides analog output signals indicative of each of said pulse code modulated signals whereby said telephone means can be utilized to both place an outgoing digital signal on said highway means and receive incoming digital signals from said highway means during each of said predetermined time frames to thereby provide apparent simultaneous speaking and listening capabilities at said telephone means.

11. The device of claim 10 wherein said low pass filter means has a cutoff frequency of about 3300 Hz, and wherein said bandpass filter means passes a frequency range of about 300 to 3300 Hz.

12. The device of claim 10 wherein said selection means includes control means for controlling operation of said selection means.

13. The device of claim 12 wherein said control means includes a computer and a timing generator.

14. The device of claim 13 wherein said device includes level detection means connected with said low pass filter means and said computer means for verification of the presence of a valid analog signal.

15. The device of claim 10 wherein said logic gate means includes a NAND gate connected with said encoding means and a NOR gate connected with said decoding means.

16. A digital teleconferencing control system, comprising:

a plurality of channel means each of which is connectable to a different one of a plurality of subscriber telephone means and to common highway means capable of carrying digital signals between said channel means, and with each of said channel means having signal processing means for receiving, in a first mode, analog signals indicative of subscriber speech from a then connected subscriber telephone means during a predetermined time period within predetermined time frames, and responsive thereto providing digital output signals to said highway means unless a digital signal is then present on said highway means during said predetermined time period, and for receiving, in a second mode, a plurality of digital signals from said highway means and responsive thereto combining said digital signals for providing analog output signals indicative of subscriber speech, other than digital signals provided to said highway means originating from said first connecting means, to said then connected subscriber telephone means when said digital signals occur during preselected time periods within said predetermined time frames, one of which preselected time periods occurs timewise during said predetermined time period; and determining means connected with said channel means for determining the mode of operation of each of said channel means within said predetermined time frames so that the then connected subscribers can speak and listen to the others of said then connected subscribers.

17. The system of claim 16 wherein each of said channel means includes signal blocking means for inhibiting the return of a signal generated by a then selected speaking subscriber through said channel means back to said speaking subscriber.

18. The system of claim 17 wherein said signal blocking means includes logic gate means connected to pass said digital signals to said highway means and inhibit passage of digital signals from said highway means when an associated channel means is operating in said first mode and to pass said digital signals from said highway means and inhibit passage of digital signals to said highway means when said associated channel means is operating in said second mode.

19. The system of claim 16 wherein said determining means limits the number of digital signals coupled to said highway means from connected subscriber telephone means to two such signals at any given time.

20. The system of claim 16 wherein said determining means enables an associated channel means to process two digital signals from said highway means during each said predetermined time frame.

21. The system of claim 20 wherein said determining means causes each said predetermined time frame to be one hundred twenty-eight microseconds in time duration with each mode being four microseconds in time duration and separated by a time duration of sixty microseconds.

22. The system of claim 21 wherein said determining means permits a maximum of sixteen different conferences to be held simultaneously.

23. A digital teleconferencing control system, comprising:

a bridge device that includes a plurality of channel means each of which is connectable to a different one of a plurality of subscriber telephone means and to highway means capable of carrying pulse code modulated signals between said channel means, each of said channel means having codec encoding and decoding means, filter means connected between said encoding and decoding means and a connected subscriber telephone means, and logic gate means connected between said encoding and decoding means and said highway means, and each of said channel means in a first mode receiving analog signals from a connected subscriber telephone means through said filter means and responsive thereto providing a pulse code modulated output signal through said logic gate means to said highway means, and in a second mode receiving pulse code modulated signals from said highway means through said logic gate means and responsive thereto providing analog output signals;

a plurality of timing selector means each of which is connected with a different one of said channel means;

timing generator means connected with said plurality of timing selector means to provide timing pulses thereto; and computer means connected with said timing selector means for determining for a preselected conference the timing and frequency of pulses supplied by said timing selector means to its associated channel means so that no more than two channel means of said bridging device is permitted during a predetermined time frame to provide pulse code modulated output signals to said highway means pertaining to said preselected conference with each said channel means being capable of decoding both said pulse code modulated signals on said highway means pertaining to said preselected conference except for digital signals coupled to said highway means by that said channel means.

24. The system of claim 23 wherein said computer means determining thirty-two time slots within each of said predetermined time frames for use by said time selector means so that sixteen different preselected conferences can be held simultaneously utilizing said thirty-two time slots.

25. A method for teleconferencing control, said method comprising:

receiving analog signals representative of speech at a plurality of subscriber stations and generating digital output signals indicative of each;

repeatedly selecting a predetermined plural number of said generated digital signals for passage to a digital signal carrying highway with each of said selected digital signals being passed to said highway during different preselected time slots within preselected time periods and in the absence of any other digital signals then occurring on said highway within said preselected time slots to enable establishing a conference between subscribers at said plurality of subscriber stations;

conveying said selected digital signals on said highway to each of said plurality of subscriber stations then connected with said highway for decoding and combining; and decoding and combining at said subscriber stations said digital signals received from said highway that are within each of said predetermined time slots except that digital signals provided by a particular subscriber station are precluded from being decoded by that same particular subscriber station whereby the then selected plurality of speaking subscribers in said established conference can each speak and be heard by all other subscribers in said established conference to thereby establish apparent simultaneous speaking and listening capabilities at each subscriber station.

26. The method of claim 25 wherein said method includes passing said digital signals to and from said highway through logic gate means so that said digital signals can be decoded only by subscriber stations other than the subscriber stations generating said digital signals then being passed to said highway.

27. The method of claim 25 wherein said digital signals on said digital highway are decoded twice as fast as digital signals are generated and passed to said digital highway so that each subscriber can hear two speakers simultaneously.

28. The method of claim 25 wherein said method includes providing a plurality of groups of time slots within said preselected time periods during which said digital signals are generated and received, and which method also includes determining the groups of time slots to be used by each established conference so that a plurality of conferences can be simultaneously held.

29. The method of claim 28 wherein thirty-two time slots are provided to enable sixteen conferences to be held simultaneously.

* * * * *

UNITED STATES PATENT AND TRADEMARK OFFICE
CERTIFICATE OF CORRECTION

PATENT NO. : 4,541,087
DATED : September 10, 1985
INVENTOR(S) : Comstock

It is certified that error appears in the above—identified patent and that said Letters Patent is hereby corrected as shown below:

Column 5, line 59, before "connecting" insert --second--.

Signed and Sealed this

Third Day of December 1985

[SEAL]

Attest:

Attesting Officer

DONALD J. QUIGG

Commissioner of Patents and Trademarks